United States Patent
Ogrinz et al.

(10) Patent No.: US 10,999,313 B2
(45) Date of Patent: *May 4, 2021

(54) FACILITATING NETWORK SECURITY ANALYSIS USING VIRTUAL REALITY DISPLAY DEVICES

(71) Applicant: Bank of America Corporation, Charlotte, NC (US)

(72) Inventors: Michael Ogrinz, Easton, CT (US); Darryl C. Goebel, Cary, NC (US); William P. Jacobson, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 152 days.

This patent is subject to a terminal disclaimer.

(21) Appl. No.: 16/434,534

(22) Filed: Jun. 7, 2019

(65) Prior Publication Data

US 2019/0286415 A1    Sep. 19, 2019

Related U.S. Application Data

(63) Continuation of application No. 15/367,896, filed on Dec. 2, 2016, now Pat. No. 10,481,862.

(51) Int. Cl.
| | |
|---|---|
| *H04L 29/06* | (2006.01) |
| *G06F 3/16* | (2006.01) |
| *H04L 29/08* | (2006.01) |
| *G06K 9/32* | (2006.01) |

(52) U.S. Cl.
CPC .......... *H04L 63/1433* (2013.01); *G06F 3/167* (2013.01); *G06K 9/3266* (2013.01); *H04L 67/12* (2013.01)

(58) Field of Classification Search
CPC ..... G06F 3/167; H04L 63/1433; H04L 67/12; G06K 9/3266
See application file for complete search history.

(56) References Cited

U.S. PATENT DOCUMENTS

| | | |
|---|---|---|
| 5,999,944 A | 12/1999 | Lipkin |
| 6,408,257 B1 | 6/2002 | Harrington et al. |
| 6,602,075 B2 | 8/2003 | Adams |
| 6,602,076 B2 | 8/2003 | Adams |

(Continued)

FOREIGN PATENT DOCUMENTS

CN    103635920 A    3/2014

OTHER PUBLICATIONS

Saettler, M., "Westpac integrates augmented reality into bank account management," http://www.mobilecommercedaily.com/westpac-integrates-augmented-reality-into-bank-account-management, Aug. 6, 2014, 8 pages.

(Continued)

*Primary Examiner* — Huan V Doan
(74) *Attorney, Agent, or Firm* — Michael A. Springs (57) ABSTRACT

A virtual reality system including a virtual reality user device with a display that presents a virtual reality environment to a user, an electronic transfer engine, and a virtual overlay engine. The virtual reality user devices receives network component data and security data for a network components. The virtual reality user devices generates overlays the security data onto the network component data to generate a virtual overlay.

20 Claims, 4 Drawing Sheets

(56) References Cited

U.S. PATENT DOCUMENTS

| | | |
|---|---|---|
| 6,625,299 B1 | 9/2003 | Meisner et al. |
| 6,871,140 B1 | 3/2005 | Florance et al. |
| 6,941,001 B1 | 9/2005 | Bolle et al. |
| 7,099,850 B1 | 8/2006 | Mann, II et al. |
| 7,392,208 B2 | 6/2008 | Morse et al. |
| 7,680,694 B2 | 3/2010 | Glazer et al. |
| 7,817,104 B2 | 10/2010 | Ryu et al. |
| 7,831,471 B2 | 11/2010 | Adams |
| 7,834,883 B2 | 11/2010 | Adams |
| 8,069,095 B2 | 11/2011 | Glazer et al. |
| 8,165,924 B2 | 4/2012 | Smyers et al. |
| 8,285,638 B2 | 10/2012 | Jung et al. |
| 8,326,704 B2 | 12/2012 | Glazer et al. |
| 8,396,738 B1 | 3/2013 | Allan et al. |
| 8,417,625 B2 | 4/2013 | Bannerjee et al. |
| 8,433,650 B1 | 4/2013 | Thomas |
| 8,438,001 B2 | 5/2013 | Natarajan et al. |
| 8,438,110 B2 | 5/2013 | Calman et al. |
| 8,442,295 B2 | 5/2013 | Sam |
| 8,442,906 B1 | 5/2013 | Thomas |
| 8,451,266 B2 | 5/2013 | Hertenstein |
| 8,577,803 B2 | 11/2013 | Chatterjee et al. |
| 8,589,255 B2 | 11/2013 | Glazer et al. |
| 8,601,386 B2 | 12/2013 | Altberg et al. |
| 8,611,601 B2 | 12/2013 | Calman et al. |
| 8,612,363 B2 | 12/2013 | Karkanias et al. |
| 8,635,104 B2 | 1/2014 | Adams |
| 8,660,951 B2 | 2/2014 | Calman et al. |
| 8,688,594 B2 | 4/2014 | Thomas et al. |
| 8,718,612 B2 | 5/2014 | Calman et al. |
| 8,743,145 B1 | 6/2014 | Price |
| 8,803,916 B1 | 8/2014 | Paczkowski et al. |
| 8,805,739 B2 | 8/2014 | Brown et al. |
| 8,810,599 B1 | 8/2014 | Tseng |
| 8,890,896 B1 | 11/2014 | Tseng |
| 8,929,591 B2 | 1/2015 | Calman et al. |
| 8,990,914 B2 | 3/2015 | Da Cruz Pinto et al. |
| 9,007,473 B1 | 4/2015 | Worley, III et al. |
| 9,026,486 B2 | 5/2015 | Doorhy et al. |
| 9,044,673 B1 | 6/2015 | Ahuja et al. |
| 9,047,636 B2 | 6/2015 | Ross |
| 9,066,200 B1 | 6/2015 | Loxam et al. |
| 9,082,149 B2 | 7/2015 | Argue et al. |
| 9,092,600 B2 | 7/2015 | Scavezze et al. |
| 9,092,898 B1 | 7/2015 | Fraccaroli et al. |
| 9,100,493 B1 | 8/2015 | Zhou et al. |
| 9,105,013 B2 | 8/2015 | Chavez |
| 9,111,383 B2 | 8/2015 | Fein et al. |
| 9,153,074 B2 | 10/2015 | Zhou et al. |
| 9,223,950 B2 | 12/2015 | Li et al. |
| 9,230,367 B2 | 1/2016 | Stroila |
| 9,251,504 B2 | 2/2016 | Chavez |
| 9,317,860 B2 | 4/2016 | Calman et al. |
| 9,331,969 B2 | 5/2016 | Barak et al. |
| 9,338,589 B2 | 5/2016 | Loxam et al. |
| 9,342,928 B2 | 5/2016 | Rasane et al. |
| 9,349,118 B2 | 5/2016 | Chavez |
| 9,355,123 B2 | 5/2016 | Wnuk et al. |
| 9,367,878 B2 | 6/2016 | Rao |
| 2002/0044152 A1 | 4/2002 | Abbott, III et al. |
| 2010/0238161 A1 | 9/2010 | Varga et al. |
| 2011/0134108 A1 | 6/2011 | Hertenstein |
| 2012/0156668 A1 | 6/2012 | Zelin |
| 2012/0232966 A1 | 9/2012 | Calman et al. |
| 2012/0232968 A1 | 9/2012 | Calman et al. |
| 2012/0232976 A1 | 9/2012 | Calman et al. |
| 2012/0232977 A1 | 9/2012 | Calman et al. |
| 2012/0310826 A1 | 12/2012 | Chatterjee |
| 2013/0166332 A1 | 6/2013 | Hammad |
| 2013/0226682 A1 | 8/2013 | Grossman |
| 2014/0040127 A1 | 2/2014 | Chatterjee et al. |
| 2014/0067712 A1 | 3/2014 | Prasad et al. |
| 2014/0100994 A1 | 4/2014 | Tatzel et al. |
| 2014/0172559 A1 | 6/2014 | Calman et al. |
| 2014/0181678 A1 | 6/2014 | Louchheim et al. |
| 2014/0279426 A1 | 9/2014 | Holman et al. |
| 2014/0330511 A1 | 11/2014 | Tison et al. |
| 2014/0337175 A1 | 11/2014 | Katzin et al. |
| 2014/0379468 A1 | 12/2014 | Ganesh et al. |
| 2015/0012426 A1 | 1/2015 | Purves et al. |
| 2015/0046284 A1 | 2/2015 | Hart |
| 2015/0058229 A1 | 2/2015 | Wiacek et al. |
| 2015/0066722 A1 | 3/2015 | Calman et al. |
| 2015/0073907 A1 | 3/2015 | Purves et al. |
| 2015/0082203 A1 | 3/2015 | James et al. |
| 2015/0154446 A1 | 6/2015 | Masood et al. |
| 2015/0186984 A1 | 7/2015 | Loganathan |
| 2015/0206218 A1 | 7/2015 | Banerjee et al. |
| 2015/0221151 A1 | 8/2015 | Bacco et al. |
| 2015/0229750 A1 | 8/2015 | Zhou et al. |
| 2015/0254510 A1 | 9/2015 | McKinnon et al. |
| 2015/0294322 A1 | 10/2015 | Grigg et al. |
| 2015/0302027 A1 | 10/2015 | Wnuk et al. |
| 2015/0324562 A1 | 11/2015 | Scavezze et al. |
| 2015/0339468 A1 | 11/2015 | Son et al. |
| 2015/0348329 A1 | 12/2015 | Carre et al. |
| 2015/0363761 A1 | 12/2015 | Grigg et al. |
| 2015/0363764 A1 | 12/2015 | Grigg et al. |
| 2016/0026253 A1 | 1/2016 | Bradski |
| 2016/0049095 A1 | 2/2016 | Yannier et al. |
| 2016/0063484 A1 | 3/2016 | Carpenter et al. |
| 2016/0063517 A1 | 3/2016 | Sorensen |
| 2016/0078449 A1 | 3/2016 | Banerjee |
| 2016/0098936 A1 | 4/2016 | Solomon |
| 2016/0171767 A1 | 6/2016 | Anderson |
| 2016/0188861 A1 | 6/2016 | Todeschini |
| 2016/0189426 A1 | 6/2016 | Thomas et al. |
| 2016/0206960 A1 | 7/2016 | Allen et al. |
| 2016/0210784 A1 | 7/2016 | Ramsby et al. |
| 2016/0210790 A1 | 7/2016 | Rasane et al. |
| 2016/0217623 A1 | 7/2016 | Singh |
| 2016/0259929 A1 | 9/2016 | Cash |
| 2016/0267759 A1 | 9/2016 | Kerzner |
| 2016/0269376 A1 | 9/2016 | Goyal |
| 2017/0091998 A1* | 3/2017 | Piccolo, III ............ G06F 3/147 |
| 2018/0077200 A1* | 3/2018 | Apvrille ............ H04L 63/1416 |

OTHER PUBLICATIONS

Dolan, H. et al., "Facilitating Digital Data Transfers Using Augmented Reality Display Devices," U.S. Appl. No. 15/353,005, filed Nov. 16, 2016, 50 pages.

Johansen, J. N. et al., "Real World Gamification Using Augmented Reality User Devices ," U.S. Appl. No. 15/377,690, filed Dec. 13, 2016, 70 pages.

Adams, A. J. et al., "Virtual Reality Dynamic Authentication," U.S. Appl. No. 15/367,590, filed Dec. 2, 2016, 58 pages.

Lee, J. et al., "Contextual Augmented Reality Overlays," U.S. Appl. No. 15/363,388, filed Nov. 29, 2016, 50 pages.

Waldron, W. H. et al., "Virtual Assessments Using Augmented Reality User Devices," U.S. Appl. No. 15/364,927, filed Nov. 30, 2016, 85 pages.

Votaw, E. S. et al., "Remote Document Execution and Network Transfer Using Augmented Reality Display Devices," U.S. Appl. No. 15/353,370, filed Nov. 16, 2016, 42 pages.

Dolan, H. et al., "Augmented Reality Headset and Digital Wallet," U.S. Appl. No. 15/363,692, filed Nov. 29, 2016, 41 pages.

Johansen, J. N., "Facilitating Dynamic Across-Network Location Determination Using Augmented Reality Display Devices," U.S. Appl. No. 15/372,909, filed Dec. 8, 2016, 44 pages.

Ogrinz, M. et al., "Facilitating Network Security Analysis Using Virtual Reality Display Devices." U.S. Appl. No. 15/367,896, filed Dec. 2, 2016, 44 pages.

Dintenfass, K., "Property Assessments Using Augmented Reality User Devices," U.S. Appl. No. 15/367,435, filed Dec. 2, 2016, 81 pages.

Wadley, C. D. et al., "Facilitating Across-Network, Multi-User Sessions Using Augmented Reality Display Devices," U.S. Appl. No. 15/397,086, filed Jan. 3, 2017, 49 pages.

Dintenfass, K., "Geo-targeted Property Analysis Using Augmented Reality User Devices," U.S. Appl. No. 15/367,554, filed Dec. 2, 2016, 80 pages.

(56) References Cited

OTHER PUBLICATIONS

Adams, A. J. et al., "Augmented Reality Dynamic Authentication for Electronic Transactions," U.S. Appl. No. 15/367,551, filed Dec. 2, 2016, 57 pages.

Lee, J., "Facilitating Digital Data Transfers Using Virtual Reality Display Devices," U.S. Appl. No. 15/363,185, filed Nov. 29, 2016, 52 pages.

Dintenfass, K., "Real Estate Property Project Analysis Using Augmented Reality User Devices," U.S. Appl. No. 15/367,822, filed Dec. 2, 2016, 81 pages.

Adams, A. J. et al., "Augmented Reality Dynamic Authentication," U.S. Appl. No. 15/367,502, filed Dec. 2, 2016, 57 pages.

Waldron, W. H. et al., "Virtual Behavior Training Using Augmented Reality User Devices," U.S. Appl. No. 15/377,795, filed Dec. 13, 2016, 71 pages.

Dolan, H. et al., "User Authentication and Authorization for Electronic Transaction," U.S. Appl. No. 15/363,495, filed Nov. 29, 2016, 41 pages.

Waldron, W. H. et al., "Geolocation Notifications Using Augmented Reality User Devices," U.S. Appl. No. 15/365,272, filed Nov. 30, 2016, 85 pages.

Waldron, W. H. et al., "Object Recognition and Analysis Using Augmented Reality User Devices," U.S. Appl. No. 15/365,511, filed Nov. 30, 2016, 86 pages.

Wadley, C. D. et al., "Facilitating Across-Network Handoffs for Devices Using Augmented Reality Display Devices," U.S. Appl. No. 15/397,031, filed Jan. 3, 2017, 49 pages.

Wadley, C. D. et al., "Facilitating Across-Network Handoffs for an Assistant Using Augmented Reality Display Devices," U.S. Appl. No. 15/397,125, filed Jan. 3, 2017, 48 pages.

Johansen, J. N., "Facilitating Dynamic Across-Network Location Determination Using Augmented Reality Display Devices," U.S. Appl. No. 15/372,964, filed Dec. 8, 2016, 43 pages.

* cited by examiner

FACILITATING NETWORK SECURITY ANALYSIS USING VIRTUAL REALITY DISPLAY DEVICES

CROSS-REFERENCE TO RELATED APPLICATIONS

The present application is a continuation of U.S. Nonprovisional application Ser. No. 15/367,896 filed Dec. 2, 2016, by Michael Ogrinz et al. and entitled "FACILITATING NETWORK SECURITY ANALYSIS USING VIRTUAL REALITY DISPLAY DEVICES," which is hereby incorporated by reference as if reproduced in its entirety.

TECHNICAL FIELD

The present disclosure relates generally to performing operations using a virtual reality display device that presents virtual objects in a virtual reality environment.

BACKGROUND

Networks are increasingly susceptible to cyber-attacks. Individuals may exploit network vulnerabilities to employ cyber-attacks by various means to steal, alter, or destroy a target by hacking into a susceptible system. Cyber-attacks may originate at an unsecure network component. For example, a computer hacker may access a network through an unsecure network component to launch a cyber-attack.

Security measures are employed within network components to prevent cyber-attacks. For example, firewalls, demilitarized zones, antivirus software, software patches, and other types of security measures are used to prevent cyber-attacks. Each component in a network may implement some, none, or all of these security measures.

Individuals may analyze security measures associated with network components in a computing networking environment to ensure the network is protected against cyber-attacks. Traditional systems provide a summary of security measures for individual network components in the form of a spreadsheet or text-based report. When a person is looking for information related to network security, the person must view individual security features of disparate network components separately. Presenting information in the form of reports or spreadsheets may not allow a person to determine the overall security of an enterprise's network rapidly, and thus may decrease network security. Thus, it is desirable to provide the ability to efficiently request information regarding network components in a way that increases the security network systems.

SUMMARY

In one embodiment, a virtual reality system includes one or more databases and a virtual reality user device. The one or more databases include network component data and security data for a plurality of network components. The network component data includes the network interconnections and location of each of the plurality of network components. The network component data further includes one or more data types associated with each of the plurality of data network components.

The security data may include software patch update information that indicates the most recent software patch update for the network component, demilitarized zone information indicating whether the data network component is in a demilitarized zone, firewall information indicating the firewall type and status, and antivirus information indicating the software type and status of antivirus software.

The virtual reality user device includes a display configured to present a virtual reality environment to the user. The virtual reality user device further includes one or more processors operably coupled to the display. The virtual reality user device further includes an electronic transfer engine configured to receive operational data and a virtual overlay engine. The virtual overlay engine presents a first network component in the virtual reality environment, the presentation indicating network connections of the first network component. The virtual overlay engine overlays the security data for the first network component onto the first network component in the virtual reality environment.

In another embodiment, a virtual reality user device includes a display configured to present a virtual reality environment to the user. The virtual reality user device further includes one or more processors operably coupled to the display. The virtual reality user device further includes an electronic transfer engine configured to receive operational and virtual data. This data includes network component data for a plurality of network components and security data for each of the plurality of network components.

The virtual reality user device further includes a virtual overlay engine. The virtual overlay engine identifies a first network component of a plurality of data network components. The virtual overlay engine presents a first network component in the virtual reality environment, the presentation indicating network connections of the first network component. The virtual overlay engine further overlays the security data for the first network component onto the first network component in the virtual reality environment.

The present embodiment presents several technical advantages. In one embodiment, a virtual reality user device allows a user to view a network topology that includes all or substantially all network components in a network. Displaying network components and interconnections among them allows a user to determine how network components in the network interact. This increases the security of a network by allowing a user to identify network vulnerabilities by viewing network component interconnections.

In one embodiment, a virtual reality user device allows a user to view information relating to the security of a network system. Allowing a user to visualize all or substantially all of the security information relating to network components in one viewing screen, allows the user to appreciate the breadth and depth of security measures of network systems. This allows a user to identify failures or potential failures in a system's security, thus increasing the network security of the system. This embodiment further allows users to determine network security risks that are pervasive across a plurality of network components.

Another technical advantage is the virtual reality user device provides a virtual reality environment where information can only be seen by the virtual reality user device user. This provides privacy to the user's information and increases the security of the overall system.

In one embodiment, a virtual reality user device increases security of communicating network component data and security data for a network. The virtual reality user device allows the user to authenticate themselves, which then allows the user to request and obtain information that is specific to the user. This reduces or eliminates unintended access to the data.

The virtual reality user device generates user tokens that identify the user, which improves the performance of the virtual reality user device by reducing the amount of information required to identify and authenticate the user. Using user tokens also reduces the amount information used to request information linked with the user. User tokens are encoded or encrypted to obfuscate and mask information being communicated across a network. Masking the information being communicated protects users and their information in the event unauthorized access to the network and/or data occurs.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Enterprises may have systems that include a variety of network components at a varying geographic locations. Systems may include a number of network components. Network components may store and/or transmit varying volumes of information, such as digital data files. Users may request to view information for network components. For example, a request may include a request to view capabilities of a network component, the location of a network component, and the types of digital data files associated with the network component. Providing this information to a user presents several technical challenges.

Digital data files may include confidential information. For example, a network component such as a server may store personal information such as a social security numbers, bank account information, or any other type of confidential information. Users may perform a security risk analysis. Users may submit a request to determine if a network components contains confidential information. Depending on the type of information, a user may request to view security information for the network component. For example, a user may request whether a network component has a current software patch update, whether the network component is protected by an operating firewall, whether the network component is operating antivirus software, and whether the network component is in a demilitarized zone. Providing this information to a user presents several technical challenges.

Existing systems may not be capable of providing security information to users. Existing systems may not track security measures to protect individual network components in a network. If an existing system does track these security measures, a user may have to make individual requests to each of the different sources in order to obtain the desired information. The system returns individual security features of disparate network components separately. For example, the system may return a text report or a spreadsheet that indicates security features of disparate network components. Presenting information in the form of reports or spreadsheets may not allow a person to determine the overall security of an enterprise's network. For example, existing systems do not indicate how network components interact within a system. As systems have a large number of network components that store and/or communicate varying degrees of information, a user may not be able to adequately perform a security analysis by merely viewing a report. For example, a user may not see patterns of security lapses across a system or otherwise receive a full picture of a system's security in context. Network components may be connected in a system. The network components may communicate information to and receive information from other network components in the network. A report may not adequately convey how network components are connected. A report may not adequately convey what types of information are stored in and communicated between network components. Thus, it is desirable to provide the ability to efficiently review information regarding network components in a way that increases the security network systems.

This disclosure recognizes the technical advantages of displaying network components in a virtual environment. A user may view virtual network components and security information associated with the network components. Each virtual network component corresponds to an actual network component of a system. A virtual reality user device displays a network topology for a network. A user may view information for one or more virtual network components via the virtual display. A user may view the network topology to view network components of the system and interconnections of network components. A user may move throughout the virtual space to view additional network components. This provides the technical advantage of allowing a user to determine the operation of a network. Existing systems may present network information in the form of a text report or spreadsheet. Some networks may include hundreds or thousands of network components. Determining interconnections between each of these components with a text report or spreadsheet is difficult or impossible. This disclosure recognizes the advantage of virtually displaying representations of network components, along with interconnections between the components, to allow a user to determine how a network operates.

Security information is virtually overlaid onto the virtual network components in the virtual display. Security information generally indicates whether a network component is secure. For example, security information may indicate whether a network component has received a software patch update, whether the network component is adequately protected by a firewall and/or antivirus software, and/or whether a network component is in a demilitarized zone. A user may view a network component to determine whether it is associated with confidential information. A user may determine whether other network components connected to the network component are associated with confidential information. Depending on the level of confidential information associated with the network component, the user may view the overlaid security information for the component to determine whether adequate securities measures are in place to protect the confidential information and/or the network.

The virtual display of network components with their associated security overlays provides the technical advantage of allowing users to determine and fix network component security issues that are pervasive throughout a network. A traditional system may communicate an alert to a user that a disparate network component is inadequately secured. This disclosure contemplates the virtual display allowing a user to determine a pattern of security risks. For example, the virtual display may indicate that a network component is inadequately secured. The display allows the user to view similar network components connected to the network component or throughout the network to determine whether the additional network components include the same security inadequacy. For example, the display may indicate that a network server has not received a latest software patch update. The user may view similar servers in the displayed network topology to determine whether the similar servers received the software patch update. This provides the advantage of allowing a user to address network security issues on a network level, rather than a network component level.

Securely transferring data and information across a network poses several technical challenges. Networks are susceptible to attacks by unauthorized users trying to gain access to sensitive information being communicated across the network. Unauthorized access to a network may compromise the security of the data and information being communicated across the network.

One technical solution for improving network security is a virtual reality user device that generates and uses user tokens to allow a user to send information for requesting potentially sensitive information for the user. The virtual reality user device allows user tokens to be generated automatically upon identifying and authenticating the user. The user token may be encoded or encrypted to obfuscate the information being communicated by it. Using user tokens to mask information that is communicated across the network protects users and their information in the event of unauthorized access to the network and/or data occurs. The user tokens also allow for data transfers to be executed using less information than other existing systems, and thereby reduces the amount of data that is communicated across the network. Reducing the amount of data that is communicated across the network improves the performance of the network by reducing the amount of time network resources are occupied.

Information in a virtual reality environment can only be seen by the user of the virtual reality user device. Other people around the virtual reality user device user are unable to see any potentially sensitive information the user is viewing. As a result, the virtual reality user device provides privacy to the user's information and increases the security of the overall system.

Figure 1:
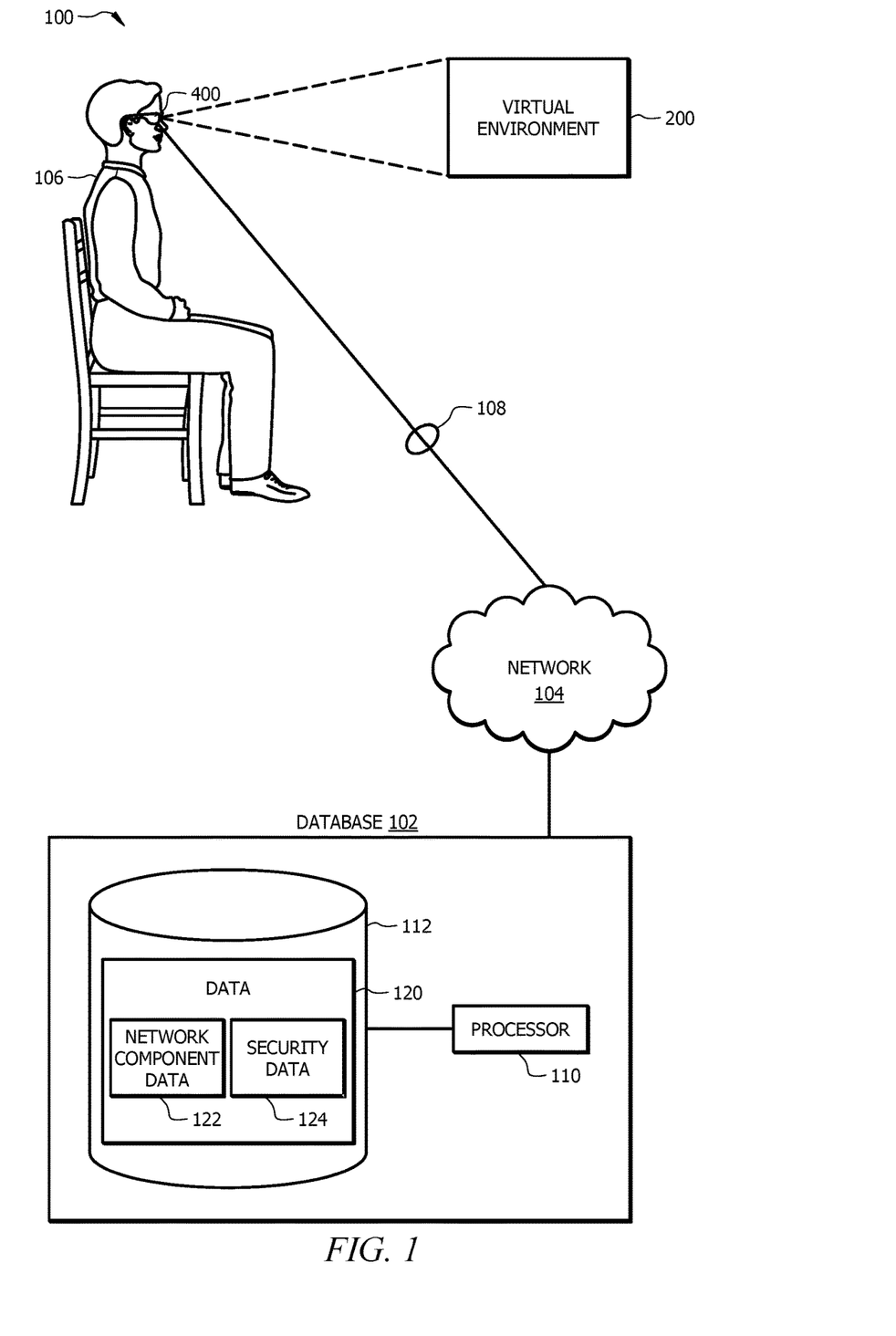
FIG. 1 is a schematic diagram of an embodiment of a virtual reality system configured to present virtual objects in a virtual reality environment.
Figure 2:
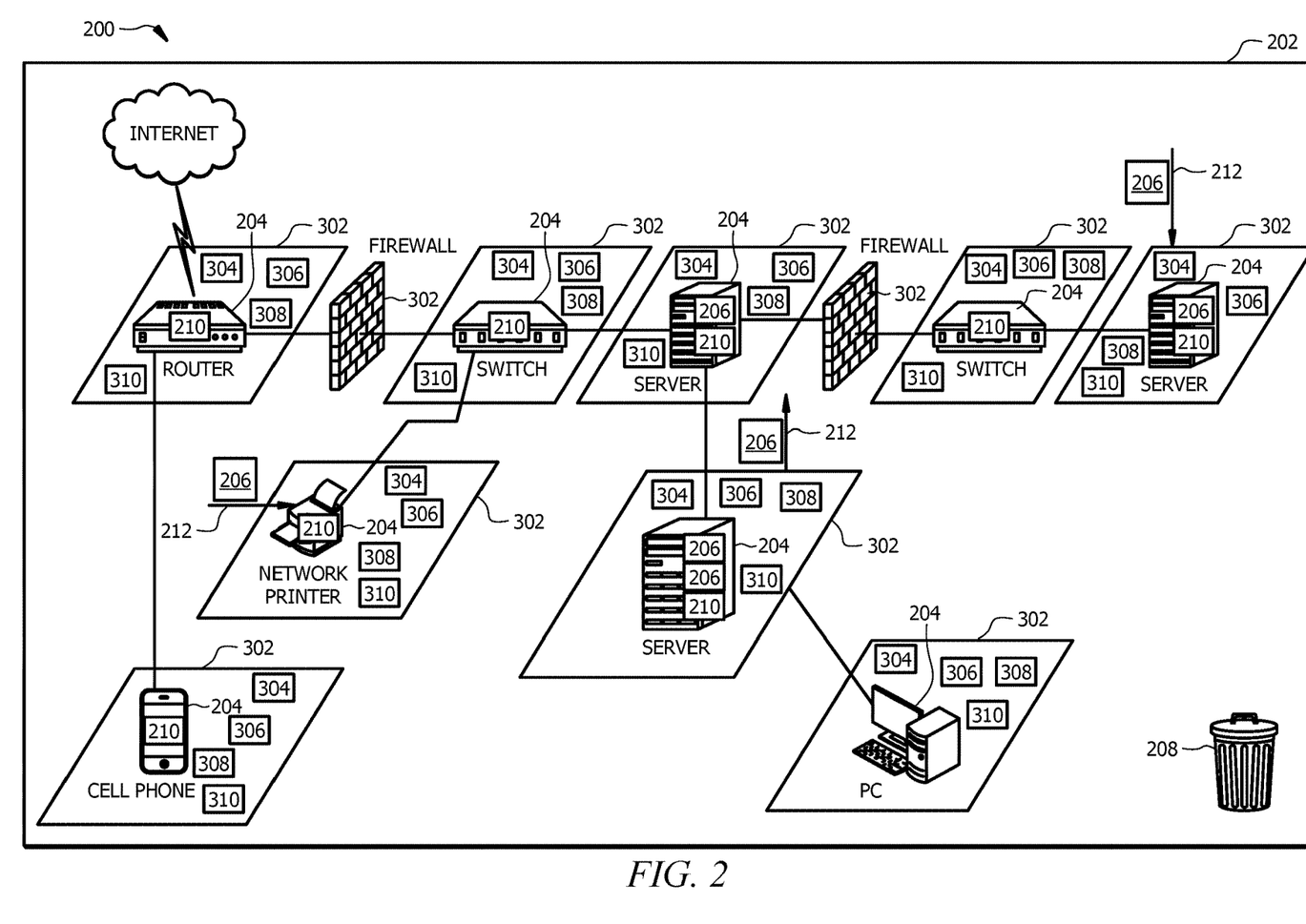
FIG. 2 is a first person view of an embodiment for a virtual reality user device display presenting virtual objects within a virtual reality environment.
Figure 4:
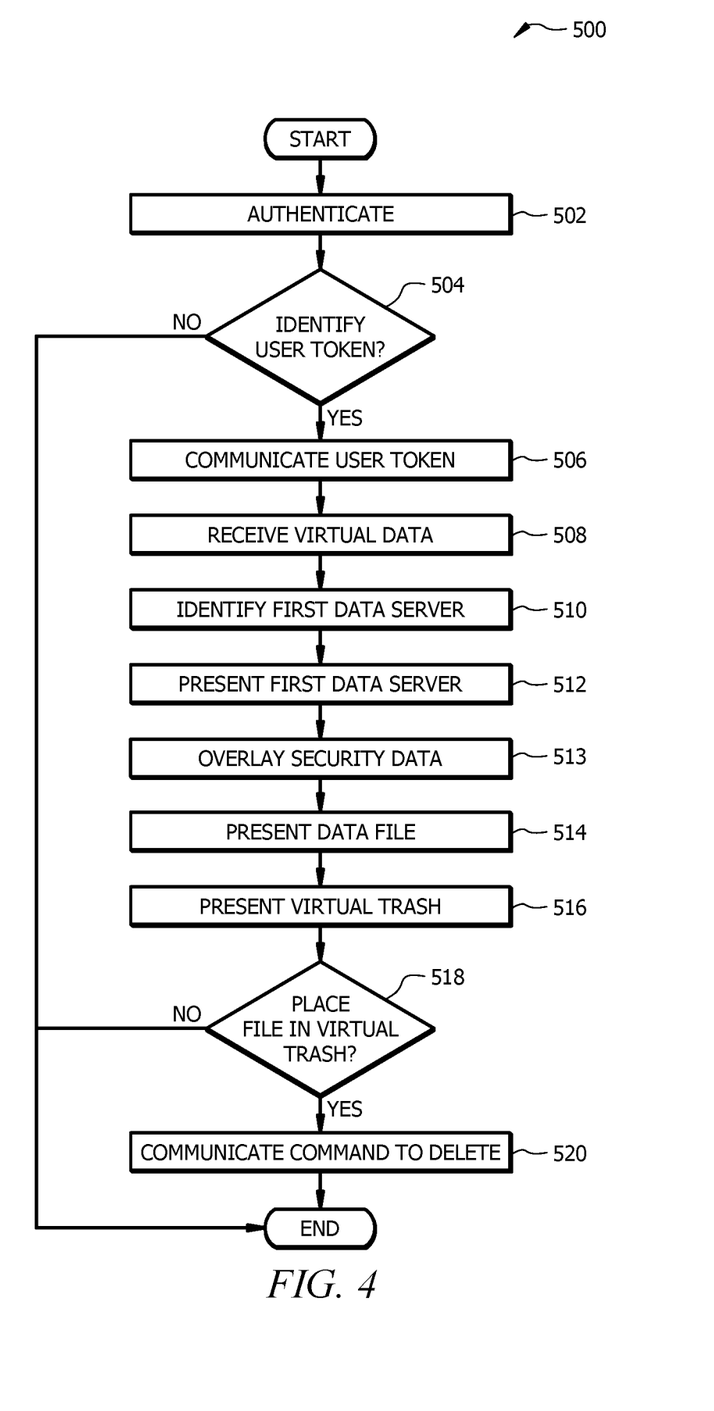
FIG. 4 is a flowchart of an embodiment of a virtual reality overlaying method.

FIG. 1 illustrates a user employing a virtual reality user device to view virtual objects in a virtual environment. FIG. 2 provides first person views of what a user might see when using the virtual reality user device to view virtual objects in the virtual environment. FIG. 4 is an example of a process for retrieving and presenting virtual objects in a virtual reality environment.

FIG. 1 is a schematic diagram of an embodiment of a virtual reality system 100 configured to present virtual objects in a virtual reality environment 200. The virtual reality system 100 includes a virtual reality user device 400 in signal communication with a database 102 via a network 104. The virtual reality user device 400 is configured to employ any suitable connection to communicate data with the database 102. In FIG. 1, the virtual reality user device 400 is configured as a head-mounted wearable device. Other examples of wearable devices are integrated into an eye glass structure, a visor structure, a helmet structure, a contact lens, or any other suitable structure. In some embodiments, the virtual reality user device 400 comprises a mobile user device integrated with the head-mounted wearable device. Examples of mobile user devices include, but are not limited to, a mobile phone and a smart phone. Additional details about the virtual reality user device 400 are described in FIG. 3.

Examples of a virtual reality user device 400 in operation are described below and in FIG. 4. The virtual reality user device 400 is configured to identify and authenticate a user 106. The virtual reality user device 400 is configured to use one or more mechanisms such as credentials (e.g. a log-in and password) or biometric signals to identify and authenticate the user 106. For example, the virtual reality user device 400 is configured to receive an input (e.g. credentials and/or biometric signals) from the user 106 and to compare the user's input to verification data that is stored for the user 106 to authenticate the user 106. In one embodiment, the verification data is previously stored credentials or biometric signals for the user 106.

The virtual reality user device 400 is further configured to identify a user token 108 for the user 106 once the user 106 has been authenticated. The user token 108 is a label or descriptor (e.g. a name) used to uniquely identify the user 106. In one embodiment, the virtual reality user device 400 selects the user token 108 from a plurality of user tokens 108 based on the identity of the user 106. In other embodiments, the virtual reality user device 400 selects or identifies the user token 108 based on any other criteria for the user 106. The virtual reality user device 400 is configured to send the identified user token 108 to the database 102 to request data 120 for the user 106. The data 120 includes, but is not limited to network component data 122 and security data 124. Virtual reality user device 400 is configured to receive data 120 and generate a virtual display to user 106 that includes data 120. In some embodiments, the display provides information to user 106 that includes details of one or more network components. This allows user 106 to gain an understanding of the network components, including their capacity, location, and security risks.

Network component data 122 generally includes information for one or more network components. A network component may be a router, a switch, a modem, a web client, a web server, a printer, a personal computer, a cellular phone, and/or any other type of component that is communicatively coupled to a network. In some embodiments, virtual reality user device 400 displays network component data 122 in a graphical form. A user 106 may view network component data 122 using virtual device 400 to gain an understanding of a system's network layout and security risks. Network component data 122 may include information for one or more of the network components as discussed in relation to FIG. 2. Network component data may indicate connections of a network component; a network that a network component is in; whether a network component is in a demilitarized zone; and/or any other suitable information for a network component. Network component data 122 may include interconnections information for one or more network components. For example, network component data 122 may facilitate displaying a network topology showing interconnections between the network components of a network. Network component data 122 may indicate a capacity of one or more network components. For example, if the network component is a network server, network component data 122 may indicate an amount of data stored on a network component. As another example, network component data 122 may indicate the amount of storage available for a network component. Network component data 122 may indicate a location of one network components, such as a geographical location. For example, a plurality of network components may be located in different geographical locations. Virtual reality user device 400 may use network component data 122 to display the location of one or more network components. Network component data 122 may include data types stored in one or more network components such as a server. Network components may store any suitable type of data. In some embodiments, network components may store and/or communicate confidential data. Network component data 122 may indicate that a network components is storing, communicating, and/or receiving confidential data. Network component data 122 may include a description of the data. Network component data 122 may include any information that identifies characteristics of a network component and/or characteristics of information within the network component. Network component data 122 is discussed in more detail in relation to FIG. 2.

Security data 124 generally comprises information relating to the security of one or more network components. In some embodiments, security data 124 includes software patch update information, demilitarized zone information, firewall information, and antivirus information, among other information, for one or more network components, as discussed in more detail in relation to FIG. 2. Security data 124 generally indicates security features of one or more network components. In some embodiments, user 106 may view security data 124 using virtual reality user device 400. In some embodiments security data 124 may be overlaid on network component data 122. For example, a user may view virtual environment 200 to view network components of a system and determine how the network components interact within the system. Security data 124 for one or more displayed network components may be overlaid on the network components so it may be viewed in context with a network topology. Thus, a user may determine the security of network components in a system and how the network components interact. For example, virtual reality user device 400 may display a network component and security information relating to the network component. User 106 may determine characteristics of the network component, including security risks, by viewing virtual reality user device's 400 display. Security data 124 is discussed in more detail in relation to FIG. 2.

The virtual reality user device 106 is configured to receive data 120 from database 102 in response to sending the user token 108. The virtual reality user device 400 is configured to process the data 120 to display information for one or more network components.

The virtual reality user device 400 is configured to virtually present information for the one or more network components as virtual objects in a virtual reality environment. The virtual reality environment is a virtual warehouse, a virtual room, a virtual home, a virtual office, or any other suitable virtual environment. For example, the virtual reality environment is configured to simulate a warehouse storing a plurality of network components. The virtual reality user device 400 is further configured to overlay status tags with their corresponding network components in the virtual reality environment.

The network 104 comprises a plurality of network nodes configured to communicate data between the virtual reality user device 400 and one or more network components 102 and/or third-party databases 118. Examples of network nodes include, but are not limited to, routers, switches, modems, web clients, and web network components. The network 104 is configured to communicate data (e.g. user tokens 108 and data 120) between the virtual reality user device 400 and the database 102. Network 104 is any suitable type of wireless and/or wired network including, but not limited to, all or a portion of the Internet, the public switched telephone network, a cellular network, and a satellite network. The network 104 is configured to support any suitable communication protocols as would be appreciated by one of ordinary skill in the art upon viewing this disclosure.

The database 102 is linked to or associated with one or more institutions. Examples of institutions include, but are not limited to, organizations, businesses, government agencies, financial institutions, and universities. The database 102 is a network device comprising one or more processors 110 operably coupled to a memory 112. The one or more processors 110 are implemented as one or more central processing unit (CPU) chips, logic units, cores (e.g. a multi-core processor), field-programmable gate array (FPGAs), application specific integrated circuits (ASICs), or digital signal processors (DSPs). The one or more processors 110 are communicatively coupled to and in signal communication with the memory 112. The one or more processors 110 are configured to process data and may be implemented in hardware or software. The one or more processors 110 are configured to implement various instructions. In an embodiment, the processors 110 implement instructions using logic units, FPGAs, ASICs, DSPs, or any other suitable hardware.

The memory 112 comprises one or more disks, tape drives, or solid-state drives, and may be used as an over-flow data storage device, to store programs when such programs are selected for execution, and to store instructions and data that are read during program execution. The memory 112 may be volatile or non-volatile and may comprise read-only memory (ROM), random-access memory (RAM), ternary content-addressable memory (TCAM), dynamic random-access memory (DRAM), and static random-access memory (SRAM). The memory 112 is operable to store data 120. Data 120 stores network component data 122 and/or security data 124, as previously discussed.

The following is a non-limiting example of how the virtual reality system 100 may operate. In this example, a user 106 is sitting at their desk wearing the virtual reality user device 400. The user 106 authenticates themselves before using the virtual reality user device 400 by providing credentials (e.g. a log-in and password) and/or a biometric signal.

The virtual reality user device 400 authenticates user 106 by comparing the user's input to verification data (e.g. a biometric signal) stored for the user 106. When the user's input matches or is substantially the same as the verification data stored for the user, the virtual reality user device 400 is able to identify and authenticate the user 106. When the user's input does not match the verification data stored for the user 106, the virtual reality user device 400 is unable to identify and authenticate the user 106. The virtual reality user device 400 identifies a user token 108 for the user 106 based on the identity of the user 106 and in response to authenticating the user 106. Once the user 106 has been authenticated, the user token 108 is used by other systems and devices to identify and authenticate the user 106 without requiring the user 106 to provide additional credentials for each system. The virtual reality user device 400 sends the user token 108 to the database 102.

The database 102 receives the user token 108 and processes the user token 108 to identify the user 106. The database 102 determines whether user 106 is authorized to view data 120. The database 102 generates data 120 network using component data 122 and security data 120. The database 102 communicates the data 120 to the virtual reality user device 400.

The virtual reality user device 400 receives the data 120 and processes the data 120 to identify the one or more network components and characteristics of the network components. The virtual reality user device 400 presents the one or more network components to the user 106 as virtual objects in a virtual reality environment. For example, the virtual reality user device 400 displays the one or more network components in a virtual warehouse. In one embodiment, the virtual reality user device 400 presents a plurality of network components. The virtual reality user device 400 presents an overlay of security information for one or more network components as depicted in FIG. 2. The overlay of security information may facilitate identifying security risks of the one or more network components. Viewing how network components connect to each other within a topology of a system, and security information associated with the network components overlaid on top of the network topology, facilitates enhanced network security analysis. For example, virtual reality user device 400 may present a network component that stores highly confidential information. A user 106 may view the network component along with security information for the network component. Additionally, user 106 may view network components in communication with the network component, along with their respective security information. This allows increased network security by allowing 106 to more accurately perform a security risk analysis. For example, a traditional text report or spreadsheet may indicate a security risk of a disparate network component. The virtual overlay contemplated in this disclosure, however, allows a user to determine network security risks of a network component in context of a network as a whole. A user may determine a security risk that for a plurality of network components throughout a network. Thus, a user may identify and correct additional security risks, making the network more secure.

FIG. 2 is an example of a virtual reality user device 400 presenting virtual objects in a virtual reality environment. The virtual objects are based on the data 120 using the virtual reality user device 400. FIG. 2 is a first person view of an embodiment for a virtual reality user device 400 presenting virtual objects 202 within a virtual reality environment 200. In some embodiments, the virtual reality environment 200 is only visible to the person using a virtual reality user device 400. Other people around the user are unable to see the content being displayed to the user.

In FIG. 2, the virtual reality environment is arranged in a virtual network topology. FIG. 2 illustrates a first person view of virtual network components 204. Virtual reality user device 400 may display any suitable number of virtual network components 204. Virtual network component 204 corresponds to an actual network component. Each virtual network component 204 indicates information for its corresponding actual network component. In a virtual reality environment 200 the user 106 is able to view, move, organize, and manipulate virtual objects 202 within the virtual reality environment 200. For example, the user 106 is able to move, open, or otherwise manipulate virtual network components 204 to view additional virtual network components 204. User 106 may simulate walking within the virtual reality environment 200 to move between virtual network components 204.

The virtual reality user device 400 is presenting the user 106 with information for network components received from data 102. As illustrated, virtual reality user device displays 400 in virtual reality environment 200 virtual network components 204. Each virtual network component 204 corresponds to an actual network component of a system. Virtual network component 204 may be different sizes. A size of virtual network component 204 may indicate the capacity of the actual network component corresponding to the virtual network component 204. As another example, a size of virtual network component 204 may indicate an amount of information stored in the actual network component corresponding to the virtual network component 204. For example, when the network component is a server, the size of the virtual network component 204 corresponding to the sever may indicate the capacity and/or information stored in the server.

As illustrated, one or more virtual network components 204 may store and/or communicate virtual data files 206. Virtual data files 206 represent data files stored in an actual network component associated with virtual network component 204. Virtual reality user device 400 may use network component data 122 to generate a display including virtual data files 206. Virtual data files 206 may indicate the name and/or description of a digital data file. As another example, virtual data files 206 may indicate whether the data file is confidential. Virtual Data files 206 allow user 106 to determine the security requirements for an actual network component associated with the network component 204. For example, if virtual data files 206 indicate that an actual network component comprises highly confidential information, a user 106 may determine that high security measures should be taken to protect data in the network component.

As illustrated, virtual reality environment 200 displays data file communications 212. Generally, information is exchanged between network components in a network environment. For example, a network component may communicate one or more data files to one or more other network components. As another example, a network component may receive one or more data files from a network component or any other suitable component capable to transfer information in a network environment. User 106 may view where an actual network component is communicating digital data files by viewing data file communications 212. User 106 may view from where an actual network component is receiving digital data files using data file communications 212. User 106 may determine which data files 206 are being communicated to and/or from a network component. This may aid user 106 in determining security risks. For example, data file communications 212 may indicate if a data file is communicated outside of a demilitarized zone. As another example, data file communications 212 may indicate if a confidential data file is communicated to a network component with inadequate security procedures.

Virtual reality environment 200 displays location 210. Location 210 generally indicates the geographic location of an actual network component associated with network component 204. An enterprise may include a plurality of network components in a plurality of geographic locations. Location 210 may be utilized to locate an actual network component associated with virtual network component 204. User 106 may determine security risks associated geographic locations. For example, if user 106 determines that an actual network component includes highly confidential information, user 106 may want to ensure that the actual network component is located in a location with restricted physical access.

Virtual reality environment 200 may include virtual trashcan 208. Generally, virtual trashcan 208 allows user 206 to delete a digital data file that corresponds to virtual data file 206. User 106 may move virtual data files 206 within virtual reality environment 200. For example, user 106 may user a data glove, a stylus, or any other suitable component to move virtual data files 206 in virtual reality environment 200. Movement of virtual data files 206 in virtual reality environment 200 corresponds to movement of digital data files in the real world. For example, if user 206 moves a first digital data file from virtual network component 204*a* to virtual network component 204*b*, the actual network component associated with virtual network component 204*a* communicates the data to the actual network component associated with virtual network component 204*b*. In some embodiments, user 106 may move a virtual data file 206 to virtual trashcan 208 in virtual reality environment 200. In these embodiments, the file may be deleted from the actual network component associated with the virtual network component.

As further illustrated in FIG. 2, the virtual reality user device 400 is presenting the user 106 with security information for a virtual network component 204. Virtual reality user device 400 may present security information for one virtual network component 204 or any number of virtual network components 204. Virtual reality user 400 may use security data 120 received from database 102 to present security information for virtual network component 204. As illustrated, virtual reality user device 400 displays security overlay 302 for one or more network components. Security overlay 302 generally indicates security information for the network component 204. Security overlay 302 may be displayed in conjunction with a virtual network component 204, thus allowing user 106 to view virtual network component 204 and security information of the network component in a single viewing area. The security information may include software patch date information 304, firewall status 306, antivirus status 308, demilitarized zone status 310, and/or any other suitable security information. Security overlay 302 allows user 106 to view security information for a network component and determine security risks.

In some embodiments, security overlay 302 may provide visual indications for software patch date information 304, firewall status 306, antivirus status 308, and/or demilitarized zone status 310. Security overlay 302 may include colors to indicate security information. For example, if a network component does not have a latest software patch, security overlay 302 may include a red color associated with software patch date. As another example, if a network component's firewall is current and functioning properly, security overlay 302 may include a green color associated with firewall status 306. In some embodiments, security overlay 302 may include an audible indication. For example, security overlay 302 may include a siren, a bell, or any other audible signal to indicate a security risk.

Software patch date information 304 generally indicates software patch information for an actual network component associated with virtual network component 204. Network components may periodically receive software patch updates. Software patch updates may address security concerns in software code. For example, if it is determined that software running on a network component includes a security risk, a software patch may be created to reduce or eliminate the security risk. Software patch date information 304 may display the date that the actual network component last receive a software patch. This may allow user 106 to determine whether the network component is operating with the latest software patch. In some embodiments, software patch date information 304 may include a name of a latest installed software patch and/or a description of the software patch. Software patch date allows user 106 to determine security risks by determining whether a network component has a most current software patch update.

Firewall status 306 generally indicates a status of a firewall for an actual network component associated with virtual network component 204. Generally, a firewall is a network security system that monitors and controls incoming and outgoing network traffic from an actual network component. This disclosure contemplates any firewall known in the art or developed in the future. In some embodiments, a firewall may not be running. For example, a firewall may not be functioning properly. As another example, a firewall may disabled. Firewall status 306 indicates whether a firewall is running and/or functioning properly. For example, firewall status 306 may indicate that a firewall is running. As another example, firewall status 306 may indicate that a firewall is turned off. As yet another example, firewall status 306 may indicate that a firewall has an error. As another example, firewall status 306 may indicate that a firewall is out of date. Firewall status 306 may indicate a type of firewall on an actual network component. Firewall status 306 may indicate the name of a firewall on an actual network component. Firewall status 306 allows user 106 to determine security risks by determining whether a firewall is operating properly.

Antivirus status 308 generally indicates a status of antivirus status 308 operating on an actual network component associated with virtual network component 204. Antivirus software 308 is generally software that detects and/or removes computer viruses. Antivirus software 308 may detect and/or remove malware such as browser helper objects, ransomware, key loggers, trojan horses, worms, adware, spyware, and/or any other type of malware. This disclosure contemplates any type of antivirus software known in the art or developed in the future. In some embodiments, antivirus software may not be running. For example, antivirus software may not be functioning properly. As another example antivirus software may be disables. Antivirus status 308 indicates whether antivirus software is running and/or properly functioning. For example, antivirus status 308 may indicate that antivirus software is running. As another example, antivirus status 308 may indicate that a antivirus software is turned off. As yet another example, antivirus status 308 may indicate that antivirus software has an error. As another example, antivirus status 308 may indicate that antivirus software is out of date. In some embodiments, antivirus status 308 indicates the type of antivirus software running on a network component. For example, antivirus status 308 may indicate a brand, and/or version of antivirus software. Antivirus status 308 allows user 106 to determine security risks by determining whether antivirus is operating properly.

Demilitarized zone status 310 generally indicates whether an actual network component associated with virtual network component 204 is in a demilitarized zone. A demilitarized zone is generally a sub-network that separates an internal local area network from untrusted networks. For example, a demilitarized zone may separate an internal local area network from the Internet. In some instances, a network component outside of a demilitarized zone may be more susceptible to attacks. This disclosure contemplates any type of demilitarized zone known in the art or developed in the future. Demilitarized zone status 310 indicates whether or not an actual network component corresponding to virtual network component 204 is in a demilitarized zone. Demilitarized zone status 310 allows user 106 to determine security risks of network component 204.

The types of security information discussed above are merely examples of security measures that may be deployed in a computer network. This disclosure contemplates security overlay 302 including any type of security information, whether known at the time of this disclosure or developed in the future.

Virtual reality environment 200 allows a user view a network topology and understand and correct security risks associated with the network, thus increasing network security. Virtual reality environment 200 includes a display of the network topology for a network. A user may view information for one or more virtual network components via the virtual display. A user may view the network topology to view network components of the system and interconnections of network components. A user may move throughout the virtual space to view additional network components. This provides the technical advantage of allowing a user to determine the operation of a network. Some networks may include hundreds or thousands of network components. Determining interconnections between each of these components with a test report or spreadsheet is difficult or impossible. This disclosure recognizes the advantage of virtually displaying representations of network components, along with interconnections between the components, to allow a user to determine how a network operates.

Security information is virtually overlaid onto the virtual network components in the virtual display. A user may view a network component to determine whether it is associated with confidential information. A user may view determine whether other network components connected to the network component are associated with confidential information. Depending on the level of confidential information associated with the network component, the user may view the overlaid security information for the component to determine whether adequate securities measures are in place to protect the confidential information and/or the network, thus providing the technical advantage of increasing the security of the network.

The virtual display of network components with associated security overlays provides the technical advantage of allowing users to determine network component security issues that are pervasive throughout a network. A traditional system may communicate an alert to a user that a disparate network component is inadequately secured. This disclosure contemplates the virtual display allowing a user to determine a pattern of security risks. For example, the virtual display may indicate that a network component is inadequately secured. The display allows the user to view similar network components connected to the network component or throughout the network to determine whether the additional network components include the same security inadequacies. For example, the virtual display may indicate that a network server has not received a latest software patch update. The user may view similar servers in the displayed network topology to determine whether the similar servers received the software patch update. This provides the advantage of allowing a user to address network security issues on a network level, rather than a network component level.

Figure 3:
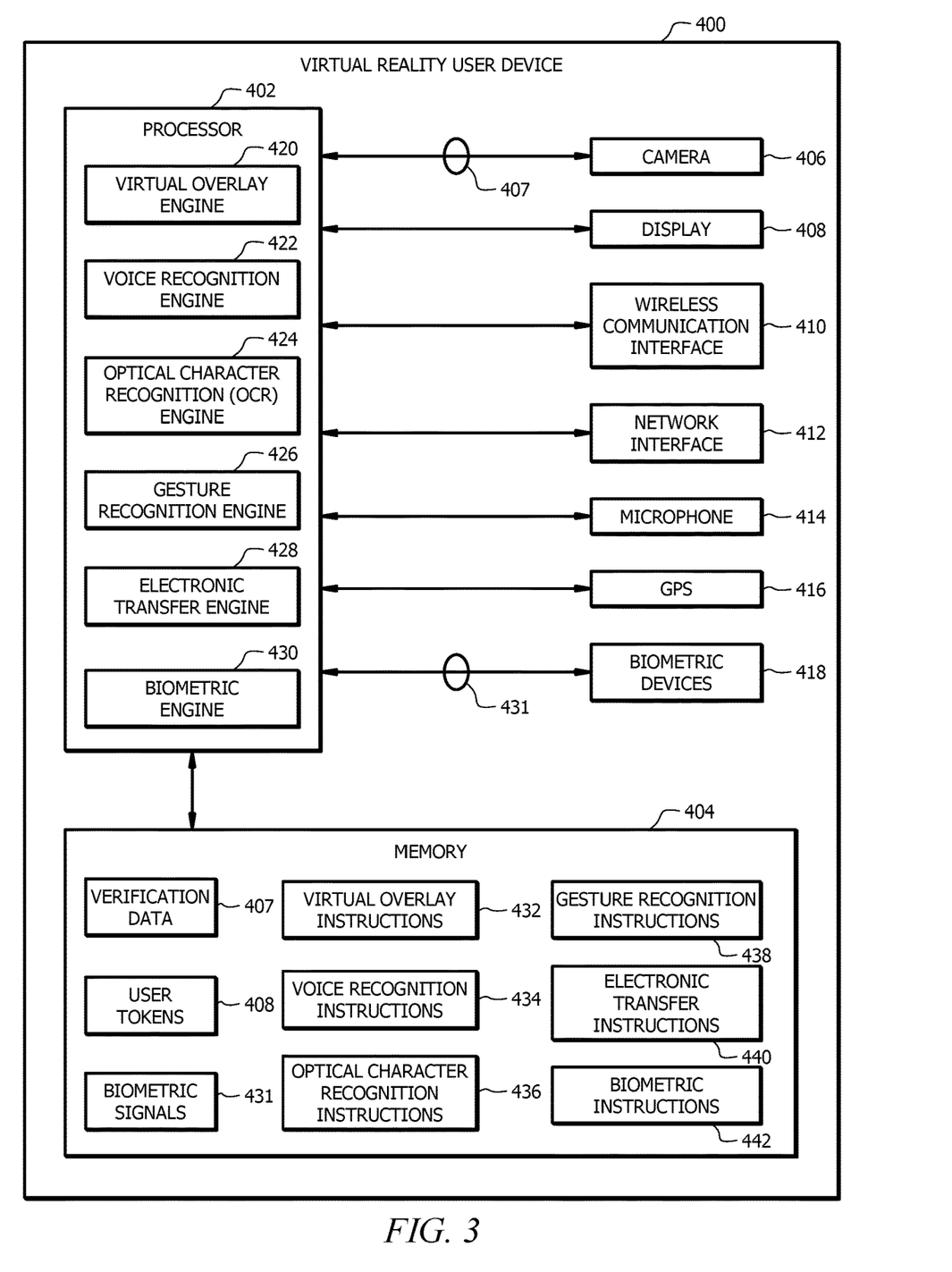
FIG. 3 is a schematic diagram of an embodiment of a virtual reality user device employed by the virtual reality system.

FIG. 3 is a schematic diagram of an embodiment of a virtual reality user device 400 employed by the virtual reality system 100. The virtual reality user device 400 is configured to authenticate a user 106, to identify a user token 108 for the user 106, to send the user token 108 to a database 102, to receive data 120 for the user 106 in response to sending the user token 108, and to present the data 120 as virtual objects in a virtual reality environment. An example of the virtual reality user device 400 in operation is described in FIG. 4.

The virtual reality user device 400 comprises a processor 402, a memory 404, a camera 406, a display 408, a wireless communication interface 410, a network interface 412, a microphone 414, a global position system (GPS) sensor 416, and one or more biometric devices 418. The virtual reality user device 400 may be configured as shown or in any other suitable configuration. For example, virtual reality user device 400 may comprise one or more additional components and/or one or more shown components may be omitted.

Examples of the camera 406 include, but are not limited to, charge-coupled device (CCD) cameras and complementary metal-oxide semiconductor (CMOS) cameras. The camera 406 is configured to capture images of people, text, and objects within a real environment. The camera 406 is configured to capture images continuously, at predetermined intervals, or on-demand. For example, the camera 406 is configured to receive a command from a user to capture an image. In another example, the camera 406 is configured to continuously capture images to form a video stream of images. The camera 406 is operable coupled to an optical character (OCR) recognition engine 424 and/or the gesture recognition engine 426 and provides images to the OCR recognition engine 424 and/or the gesture recognition engine 426 for processing, for example, to identify gestures, text, and/or objects in front of the user 106.

The display 408 is configured to present visual information to a user 106 using virtual or graphical objects in an virtual reality environment in real-time. In an embodiment, the display 408 is a wearable optical head-mounted display configured to reflect projected images for the user 106 to see. In another embodiment, the display 408 is a wearable head-mounted device comprising one or more graphical display units integrated with the structure of the wear head-mounted device. Examples of configurations for graphical display units include, but are not limited to, a single graphical display unit, a single graphical display unit with a split screen configuration, and a pair of graphical display units. The display 408 may comprise graphical display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matric OLED (AMOLED), an organic LED (OLED) display, a projector display, or any other suitable type of display as would be appreciated by one of ordinary skill in the art upon viewing this disclosure. In another embodiment, the graphical display unit is a graphical display on a user device. For example, the graphical display unit may be the display of a tablet or smart phone configured to display virtual or graphical objects in a virtual reality environment in real-time.

Examples of the wireless communication interface 410 include, but are not limited to, a Bluetooth interface, a radio frequency identifier (RFID) interface, a near-field communication (NFC) interface, a local area network (LAN) interface, a personal area network (PAN) interface, a wide area network (WAN) interface, a Wi-Fi interface, a ZigBee interface, or any other suitable wireless communication interface as would be appreciated by one of ordinary skill in the art upon viewing this disclosure. The wireless communication interface 410 is configured to allow the processor 402 to communicate with other devices. For example, the wireless communication interface 410 is configured to allow the processor 402 to send and receive signals with other devices for the user 106 (e.g. a mobile phone) and/or with devices for other people. The wireless communication interface 410 is configured to employ any suitable communication protocol.

The network interface 412 is configured to enable wired and/or wireless communications and to communicate data through a network, system, and/or domain. For example, the network interface 412 is configured for communication with a modem, a switch, a router, a bridge, a network component, or a client. The processor 402 is configured to receive data using network interface 412 from a network or a remote source.

Microphone 414 is configured to capture audio signals (e.g. voice commands) from a user and/or other people near the user 106. The microphone 414 is configured to capture audio signals continuously, at predetermined intervals, or on-demand. The microphone 414 is operably coupled to the voice recognition engine 422 and provides captured audio signals to the voice recognition engine 422 for processing, for example, to identify a voice command from the user 106.

The GPS sensor 416 is configured to capture and to provide geographical location information. For example, the GPS sensor 416 is configured to provide the geographic location of a user 106 employing the virtual reality user device 400. The GPS sensor 416 is configured to provide the geographic location information as a relative geographic location or an absolute geographic location. The GPS sensor 416 provides the geographic location information using geographic coordinates (i.e. longitude and latitude) or any other suitable coordinate system.

Examples of biometric devices 418 include, but are not limited to, retina scanners and finger print scanners. Biometric devices 418 are configured to capture information about a person's physical characteristics and to output a biometric signal 431 based on captured information. A biometric signal 431 is a signal that is uniquely linked to a person based on their physical characteristics. For example, a biometric device 418 may be configured to perform a retinal scan of the user's eye and to generate a biometric signal 431 for the user 106 based on the retinal scan. As another example, a biometric device 418 is configured to perform a fingerprint scan of the user's finger and to generate a biometric signal 431 for the user 106 based on the fingerprint scan. The biometric signal 431 is used by a biometric engine 430 to identify and/or authenticate a person.

The processor 402 is implemented as one or more CPU chips, logic units, cores (e.g. a multi-core processor), FPGAs, ASICs, or DSPs. The processor 402 is communicatively coupled to and in signal communication with the memory 404, the camera 406, the display 408, the wireless communication interface 410, the network interface 412, the microphone 414, the GPS sensor 416, and the biometric devices 418. The processor 402 is configured to receive and transmit electrical signals among one or more of the memory 404, the camera 406, the display 408, the wireless communication interface 410, the network interface 412, the microphone 414, the GPS sensor 416, and the biometric devices 418. The electrical signals are used to send and receive data (e.g. user tokens 108 and data 120) and/or to control or communicate with other devices. For example, the processor 402 transmit electrical signals to operate the camera 406. The processor 402 may be operably coupled to one or more other devices (not shown).

The processor 402 is configured to process data and may be implemented in hardware or software. The processor 402 is configured to implement various instructions. For example, the processor 402 is configured to implement a virtual overlay engine 420, a voice recognition engine 422, an OCR recognition engine 424, a gesture recognition engine 426, an electronic transfer engine 428, and a biometric engine 430. In an embodiment, the virtual overlay engine 420, the voice recognition engine 422, the OCR recognition engine 424, the gesture recognition engine 426, the electronic transfer engine 428, and the biometric engine 430 are implemented using logic units, FPGAs, ASICs, DSPs, or any other suitable hardware.

The virtual overlay engine 420 is configured to present and overlay virtual objects in a virtual reality environment using the display 408. For example, the display 408 may be head-mounted display that allows a user to view virtual objects such as documents and status tags. The virtual overlay engine 420 is configured to process data to be presented to a user as virtual objects on the display 408. Examples of presenting virtual objects in a virtual reality environment are shown in FIGS. 2 and 3.

The voice recognition engine 422 is configured to capture and/or identify voice patterns using the microphone 414. For example, the voice recognition engine 422 is configured to capture a voice signal from a person and to compare the captured voice signal to known voice patterns or commands to identify the person and/or commands provided by the person. For instance, the voice recognition engine 422 is configured to receive a voice signal to authenticate a user 106 and/or to identify a selected option or an action indicated by the user. In some embodiments, user 106 controls virtual reality device 400 using voice commands. For example, user 106 may command virtual reality user device 400 to display a virtual network component 204 using voice commands. Voice recognition engine 422 receives the command from microphone 414, and virtual reality user device 400 displays the virtual network component 204 in response to the command.

The OCR recognition engine 424 is configured to identify objects, object features, text, and/or logos using images 407 or video streams created from a series of images 407. In one embodiment, the OCR recognition engine 424 is configured to identify objects and/or text within an image captured by the camera 406. In another embodiment, the OCR recognition engine 424 is configured to identify objects and/or text in about real-time on a video stream captured by the camera 406 when the camera 406 is configured to continuously capture images. The OCR recognition engine 424 employs any suitable technique for implementing object and/or text recognition as would be appreciated by one of ordinary skill in the art upon viewing this disclosure.

The gesture recognition engine 426 is configured to identify gestures performed by a user 106 and/or other people. Examples of gestures include, but are not limited to, hand movements, hand positions, finger movements, head movements, and/or any other actions that provide a visual signal from a person. For example, gesture recognition engine 426 is configured to identify hand gestures provided by a user 106 to indicate various commands such as a command to initiate a request to move throughout a virtual warehouse as displayed in FIGS. 2 and 3. The gesture recognition engine 426 employs any suitable technique for implementing gesture recognition as would be appreciated by one of ordinary skill in the art upon viewing this disclosure.

The electronic transfer engine 428 is configured to identify a user token 108 that identifies the user 106 upon authenticating the user 106. The electronic transfer engine 428 is configured to send the user token 108 to a database 102 as part of a data request to initiate the process of obtaining information linked with the user 106. The electronic transfer engine 428 is further configured to provide the information (e.g. data 120) received from the database 102 to the virtual overlay engine 420 to present the information as one or more virtual objects in a virtual reality environment. An example of employing the electronic transfer engine 428 to request information and presenting the information to a user is described in FIG. 4.

The biometric engine 430 is configured to identify a person based on a biometric signal 431 generated from the person's physical characteristics. The biometric engine 430 employs one or more biometric devices 418 to identify a user 106 based on one or more biometric signals 431. For example, the biometric engine 430 receives a biometric signal 431 from the biometric device 418 in response to a retinal scan of the user's eye and/or a fingerprint scan of the user's finger. The biometric engine 430 compares biometric signals 431 from the biometric device 418 to verification data 407 (e.g. previously stored biometric signals 431) for the user to authenticate the user. The biometric engine 430 authenticates the user when the biometric signals 431 from the biometric devices 418 substantially matches (e.g. is the same as) the verification data 407 for the user.

The memory 404 comprise one or more disks, tape drives, or solid-state drives, and may be used as an over-flow data storage device, to store programs when such programs are selected for execution, and to store instructions and data that are read during program execution. The memory 404 may be volatile or non-volatile and may comprise ROM, RAM, TCAM, DRAM, and SRAM. The memory 404 is operable to store images, user tokens 108, biometric signals 431, verification data 407, virtual overlay instructions 432, voice recognition instructions 434, OCR recognition instructions 436, gesture recognition instructions 438, electronic transfer instructions 440, biometric instructions 442, and any other data or instructions.

Images comprises images captured by the camera 406 and images from other sources. In one embodiment, images comprises images used by the virtual reality user device 400 when performing optical character recognition. Images can be captured using camera 406 or downloaded from another source such as a flash memory device or a remote network component via an Internet connection.

Verification data 407 comprises any suitable information for identify and authenticating a virtual reality user device 400 user 106. In an embodiment, verification data 407 comprise previously stored credential and/or biometric signals 431 stored for users. Verification data 407 is compared to an input provided by a user 106 to determine the identity of the user 106. When the user's input matches or is substantially the same as the verification data 407 stored for the user 106, the virtual reality user device 400 is able to identify and authenticate the user 106. When the user's input does not match the verification data 407 stored for the user 106, the virtual reality user device 400 is unable to identify and authenticate the user 106.

Biometric signals 431 are signals or data that is generated by a biometric device 418 based on a person's physical characteristics. Biometric signal 431 are used by the virtual reality user device 400 to identify and/or authenticate a virtual reality user device 400 user 106 by comparing biometric signals 431 captured by the biometric devices 418 with previously stored biometric signals 431.

User tokens 108 are generated or identified by the electronic transfer engine 428 and sent to a database 102 to initiate a process for obtaining information linked with the user. User tokens 108 comprise any suitable information for requesting information from the database 102. In one embodiment, the user token 108 may comprise information identify a user 106. An example of the virtual reality user device 400 identifying a user token 108 to initiate a process for obtaining information linked with the user is described in FIG. 4.

The virtual overlay instructions 432, the voice recognition instructions 434, the OCR recognition instructions 436, the gesture recognition instructions 438, the electronic transfer instructions 440, and the biometric instructions 442 each comprise any suitable set of instructions, logic, rules, or code operable to execute the virtual overlay engine 420, the voice recognition engine 422, the OCR recognition engine 424, the gesture recognition engine 426, the electronic transfer engine 428, and the biometric engine 430, respectively.

FIG. 4 is a flowchart of an embodiment of a virtual reality overlaying method 500. Method 500 is employed by the processor 402 of the virtual reality user device 400 to authenticate a user and to identify a user token 108 for the user. The virtual reality user device 400 uses the user token 108 to obtain information linked with the user and to present the information to the user as virtual objects in a virtual reality environment.

At step 502, the virtual reality user device 400 authenticates the user. The user provides credentials (e.g. a log-in and password) or a biometric signal to authenticate themselves. The virtual reality user device 400 authenticates the user based on the user's input. For example, the virtual reality user device 400 compares the user's input to verification data 407 stored for the user. When the user's input matches or is substantially the same as the verification data 407 stored for the user, the virtual reality user device 400 identifies and authenticates the user. When the user's input does not match the verification data 407 stored for the user, the virtual reality user device 400 is unable to identify and authenticate the user. In one embodiment, the virtual reality user device 400 reattempts to authenticate the user by asking the user to resubmit their input.

At step 504, the virtual reality user device 400 identifies a user token 108 for the user. In one embodiment, the virtual reality user device looks up the user token 108 for the user based on the identity of the user. For example, once the user has been authenticated, the virtual reality user device 400 is able to identify the user and uses the user's identity (e.g. name) to look up the user token 108 for the user. In another embodiment, once the user has been authenticated, the virtual reality user device 400 generates a user token 108 for the user based on the identity of the user. If virtual reality user device 400 does not identify user token 108, the method ends. If virtual reality user device 400 does identify user token 108, the method proceeds to step 506, the virtual reality user device 400 communicates the user token 108 to a database 102.

At step 508, the virtual reality user device 400 receives data 120 for the user in response to sending the user token 108. As previously discussed, data 120 comprises network component data 122 and security data 124.

At step 510, the virtual reality user device 400 identifies a first network component using network component data 122. Network component data 122 may comprise information for a number of network components. Virtual reality user device identifies a network component to display to user 106. Virtual reality user device 400 presents virtual network component 204 associated with the identified first network component at step 512. In some embodiments, virtual reality user device 400 presents a network topology that includes a plurality of network components. Virtually displaying the network topology allows a understand the interconnections of network components. At step 513, virtual reality user device 400 overlays security data 124 on the displayed network component. In some embodiments, security data 124 is overlaid on each network component displayed in the virtual network topology. Overlaying security data increases network security by allowing a user to gain a full understanding of the network as a whole and its security risks, as previously discussed.

In some embodiments, virtual reality user device presents data files at step 514. As previously discussed, an actual network component may store one or more virtual data files 206. Virtual user device 400 displays virtual data files 206 associated with digital data files stored in the actual network component associated with virtual network component 204. In some embodiments, data files 206 may indicate that a network component is associated with confidential data, allowing a user to better assess security requirements of the network component.

Virtual reality user device 400 presents virtual trashcan 208 at step 518, and determines whether user 106 places one or more virtual data files 206 in virtual trashcan 208 at step 518. As previously discussed, user 106 may interact with virtual reality objects 202 in virtual reality environment 200. For example, user 106 may move objects using a data glove, a stylus, or any other suitable components. User 106 may drag a virtual file 206 from virtual network component 204 and drop the virtual file 206 in virtual trashcan 208. If user 106 does not place a virtual file 206 in virtual trashcan 208, the method ends. Otherwise, the method proceeds to step 520 where virtual reality user device 400 communicates a command to delete the digital file associated with virtual file 206 before method 500 ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A virtual reality system comprising:
one or more databases comprising:
    network component data for a plurality of network components, the network component data comprising:
        network interconnections of the plurality of network components;
        a location of each of the plurality of network components;
        one or more data types associated with each of the plurality of network components; and
    security data for each of the plurality of network components, the security data comprising:
        demilitarized zone information indicating whether the network component is in a demilitarized zone; and
a virtual reality user device for a user comprising:
    a display configured to present a virtual reality environment to the user;
    one or more processors operably coupled to the display;
    an electronic transfer engine configured to receive the network component data and the security data; and
    a virtual overlay engine configured to:
        identify a first network component of a plurality of network components;
        present the first network component in the virtual reality environment, the presentation indicating the network interconnections of the first network component; and
        overlay the security data for the first network component onto the first network component in the virtual reality environment.

2. The system of claim 1, further comprising:
a memory configured to store:
    verification data used to authenticate one or more users; and
    user tokens uniquely identifying each of the one or more users;
wherein the electronic transfer engine further is configured to:
    receive a user input identifying the user;
    compare the user input to the verification data to authenticate the user;
    identify a user token for the user in response to authenticating the user;
    send the user token to a remote database, wherein the user token requests the network component data and the security data; and
    receive the network component data and the security data in response to sending the user token.

3. The system of claim 2, wherein:
the user input is a biometric signal; and
the virtual reality user device comprises a biometric engine configured to compare the biometric signal to the verification data to authenticate the user.

4. The system of claim 3, wherein the biometric signal is one of a retinal scan signal and a fingerprint scan signal.

5. The system of claim 1, wherein:
the network component data further comprises data indicating a name and content of a plurality of data files in each of the plurality of network components; and
the virtual overlay engine is further configured to present a first data file within the first network component in the virtual reality environment.

6. The system of claim 5, further comprising:
the virtual overlay engine further configured to present a virtual trashcan in the virtual reality environment;
a gesture recognition engine configured to receive a gesture from the user indicating to place the first data file in the virtual trashcan; and
the electronic transfer engine is further configured to communicate a command to delete a digital file associated with the first data file.

7. The system of claim 1, wherein:
the virtual reality user device comprises a voice recognition engine configured to identify voice commands performed by the user; and
identifying the first network component identifying a voice command performed by the user to indicate the first network component.

8. A virtual reality overlaying method comprising:
receiving network component data for a plurality of network components, the network component data comprising:
network interconnections of the plurality of network components;
a location of each of the plurality of network components; and
one or more data types associated with each of the plurality of network components;
receiving security data for each of the plurality of network components, the security data comprising:
demilitarized zone information indicating whether the network component is in a demilitarized zone;
identifying a first network component of a plurality of network components;
presenting the first network component in a virtual reality environment to a user, the presentation indicating the network interconnections of the first network component; and
overlaying the security data for the first network component onto the first network component in the virtual reality environment.

9. The method of claim 8, further comprising:
receiving a user input identifying the user;
comparing the user input to verification data to authenticate the user;
identifying a user token for the user in response to authenticating the user;
sending the user token to a remote database, wherein the user token requests the network component data and the security data; and
receiving the network component data and the security data in response to sending the user token.

10. The method of claim 9, wherein the user input is a biometric signal and further comprising comparing the biometric signal to the verification data to authenticate the user.

11. The method of claim 10, wherein the biometric signal is one of a retinal scan signal and a fingerprint scan signal.

12. The method of claim 8, wherein the network component data further comprises data indicating a name and content of a plurality of data files in each of the plurality of network components and the method further comprising presenting a first data file within the first network component in the virtual reality environment.

13. The method of claim 12, further comprising:
presenting a virtual trashcan in the virtual reality environment;
receiving a gesture from the user indicating to place the first data file in the virtual trashcan; and
communicating a command to delete a digital file associated with the first data file.

14. The method of claim 8, further comprising:
identifying voice commands performed by the user; and
identifying the first network component identifying a voice command performed by the user to indicate the first network component.

15. A virtual reality user device for a user comprising:
a display configured to present a virtual reality environment to the user;
one or more processors operably coupled to the display;
an electronic transfer engine configured to receive data comprising:
network component data for a plurality of network components comprising:
network interconnections of each of the plurality of network components;
a location of each of the plurality of network components;
one or more data types associated with each of the plurality of network components; and
security data for each of the plurality of network components comprising:
demilitarized zone information indicating whether the network component is in a demilitarized zone;
and
a virtual overlay engine configured to:
identify a first network component of a plurality of network components;
present the first network component in the virtual reality environment, the presentation indicating the network interconnections of the first network component; and
overlay the security data for the first network component onto the first network component in the virtual reality environment.

16. The virtual reality user device of claim 15, further comprising:
a memory configured to store:
verification data used to authenticate one or more users; and
user tokens uniquely identifying each of the one or more users; and
wherein the electronic transfer engine further is configured to:
receive a user input identifying the user;
compare the user input to the verification data to authenticate the user;
identify a user token for the user in response to authenticating the user;
send the user token to a remote database, wherein the user token requests the network component data and the security data;
receive the network component data and the security data in response to sending the user token.

17. The virtual reality user device of claim 16, wherein:
the user input is a biometric signal; and
the virtual reality user device comprises a biometric engine configured to compare the biometric signal to the verification data to authenticate the user.

18. The virtual reality user device of claim 15, wherein:
the network component data further comprises data file data indicating a name and content of a plurality of data files in each of the plurality of network components; and
the virtual overlay engine is further configured to present a first data file within the first network component in the virtual reality environment.

19. The virtual reality user device of claim 18, further comprising:
the virtual overlay engine further configured to present a virtual trashcan in the virtual reality environment;
a gesture recognition engine configured to receive a gesture from the user indicating to place the first data file in the virtual trashcan; and
the electronic transfer engine is further configured to communicate a command to delete a digital file associated with the first data file.

20. The virtual reality user device of claim 15, wherein:
the virtual reality user device comprises a voice recognition engine configured to identify voice commands performed by the user; and
identifying the first network component identifying a voice command performed by the user to indicate the first network component.

* * * * *